United States Patent
Takahashi (10) Patent No.: US 9,857,898 B2
(45) Date of Patent: Jan. 2, 2018

(54) ELECTRONIC DEVICE, CONTROL METHOD, AND INTEGRATED CIRCUIT

(71) Applicant: FUJITSU LIMITED, Kawasaki-shi, Kanagawa (JP)

(72) Inventor: Yuji Takahashi, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 98 days.

(21) Appl. No.: 14/612,008

(22) Filed: Feb. 2, 2015

(65) Prior Publication Data
US 2015/0248187 A1 Sep. 3, 2015

(30) Foreign Application Priority Data
Feb. 28, 2014 (JP) ................................ 2014-039835

(51) Int. Cl.
G06F 3/041 (2006.01)
G06F 3/01 (2006.01)
(Continued)

(52) U.S. Cl.
CPC ............ *G06F 3/0412* (2013.01); *G06F 3/017* (2013.01); *G06F 3/044* (2013.01); *G06F 3/04847* (2013.01); *G06F 3/04883* (2013.01); *G06F 2203/04101* (2013.01); *G06F 2203/04104* (2013.01); *G06F 2203/04111* (2013.01); *G06F 2203/04806* (2013.01); *G06F 2203/04808* (2013.01)

(58) Field of Classification Search
None
See application file for complete search history.

(56) References Cited

U.S. PATENT DOCUMENTS 7,812,828 B2  10/2010  Westerman et al.
2009/0095540 A1  4/2009  Zachut et al.
(Continued)

FOREIGN PATENT DOCUMENTS

JP  2002-501271 A  1/2002
JP  2010-33158  2/2010
(Continued)

OTHER PUBLICATIONS

Office Action of European Patent Application No. 15152103.6 dated Mar. 8, 2016.
(Continued)

*Primary Examiner* — Larry Sternbane
*Assistant Examiner* — Nathan Brittingham
(74) *Attorney, Agent, or Firm* — Maschoff Brennan (57) ABSTRACT

An electronic device includes a detector configured to detect a region touched on a touch panel, a memory, and a processor coupled to the memory, configured to approximate a first touched region detected by the detector at a first time and a second touched region detected by the detector at a second time to ellipses, calculate angles formed between the major axes of the approximated ellipses and a reference axis of the touch panel, and calculate reference points of the approximated ellipses, and control a predetermined process based on changes of the second angle and second reference point calculated from the second touched region with respect to the first angle and first reference point calculated from the first touched region.

6 Claims, 12 Drawing Sheets

(51) Int. Cl.
*G06F 3/044* (2006.01)
*G06F 3/0488* (2013.01)
*G06F 3/0484* (2013.01)

(56) References Cited

U.S. PATENT DOCUMENTS

| | | |
|---|---|---|
| 2009/0300554 A1 | 12/2009 | Kallinen |
| 2010/0020037 A1 | 1/2010 | Narita et al. |
| 2010/0079405 A1 | 4/2010 | Bernstein |
| 2011/0199323 A1 | 8/2011 | Lin et al. |
| 2012/0030624 A1 | 2/2012 | Migos |
| 2012/0218206 A1 | 8/2012 | Sato et al. |
| 2013/0106776 A1 | 5/2013 | Park et al. |
| 2013/0217497 A1 | 8/2013 | Lim |
| 2013/0234982 A1* | 9/2013 | Kang ............... G06F 3/044 345/174 |
| 2014/0002407 A1* | 1/2014 | Badaye ............ G06F 3/04883 345/174 |
| 2014/0145975 A1* | 5/2014 | Sim ................. G06F 3/04845 345/173 |
| 2014/0320459 A1* | 10/2014 | Pettersson ........ G06F 3/0416 345/175 |
| 2015/0248187 A1* | 9/2015 | Takahashi ........ G06F 3/04883 345/174 |

FOREIGN PATENT DOCUMENTS

| | | |
|---|---|---|
| JP | 2012-108674 A | 6/2012 |
| JP | 2012-174250 | 9/2012 |
| JP | 2013-097798 A | 5/2013 |
| JP | 2014-21556 | 2/2014 |
| WO | 1999/038149 A1 | 7/1999 |

OTHER PUBLICATIONS

EESR, Extended European Search Report dated Jun. 12, 2015, from corresponding to EPC Application No. 15152103.6.

EP Summons, Summons to attend oral proceedings dated Mar. 24, 2017 from corresponding to EPC Patent Application No. 15152103.6.

Office Action of European Patent Application No. 15152103.6 dated Sep. 20, 2016.

Office Action of Japanese Patent Application No. 2014-039835 dated Aug. 1, 2017, with machine translation.

* cited by examiner

ELECTRONIC DEVICE, CONTROL METHOD, AND INTEGRATED CIRCUIT

CROSS-REFERENCE TO RELATED APPLICATION

This application is based upon and claims the benefit of priority from the prior Japanese Patent Application No. 2014-039835, filed on Feb. 28, 2014, the entire contents of which are incorporated herein by reference.

FIELD

The embodiments discussed herein are related to an electronic device, a control method, and an integrated circuit.

BACKGROUND

Currently, touch panels are installed in electronic devices of various types. In the electronic devices, "process execution instruction operations" using the touch panels are used. For example, for a smartphone, the following process execution instruction operations are used: a "swiping operation" to be performed by moving a finger on a surface of a touch panel while keeping the finger in contact with the surface of the touch panel, a "pinch-in operation" to be performed by moving two fingers so as to reduce a gap between the two fingers while keeping the fingers in contact with the surface of the touch panel, a "pinch-out operation" to be performed by moving two fingers so as to increase a gap between the two fingers while keeping the fingers in contact with the surface of the touch panel, and the like. The "swiping operation" is used to turn pages, for example. The "pinch-in operation" is used to reduce an image displayed on the touch panel, for example. The "pinch-out operation" is used to enlarge an image displayed on the touch panel, for example. These techniques are disclosed in Japanese Laid-open Patent Publication No. 2013-097798, Japanese Laid-open Patent Publication No. 2012-108674, Japanese National Publication of International Patent Application No. 2002-501271, and Japanese Laid-open Patent Publication No. 2012-174250.

SUMMARY

According to an aspect of the invention, an electronic device includes a detector configured to detect a region touched on a touch panel, a memory, and a processor coupled to the memory, configured to approximate a first touched region detected by the detector at a first time and a second touched region detected by the detector at a second time to ellipses, calculate angles formed between the major axes of the approximated ellipses and a reference axis of the touch panel, and calculate reference points of the approximated ellipses, and control a predetermined process based on changes of the second angle and second reference point calculated from the second touched region with respect to the first angle and first reference point calculated from the first touched region.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

DESCRIPTION OF EMBODIMENTS

Hereinafter, embodiments of an electronic device disclosed herein, a control program disclosed herein, a control method disclosed herein, and an integrated circuit disclosed herein are described in detail with reference to the accompanying drawings. The electronic device disclosed herein, the control program disclosed herein, the control method disclosed herein, and the integrated circuit disclosed herein are not limited to the embodiments. Although a case where the electronic device is a mobile terminal is described below, the electronic device is not limited to this. In addition, in the embodiments, configurations that have the same function are indicated by the same reference number, and a duplicated description is omitted.

First Embodiment

Example of Configuration of Terminal

Figure 1:
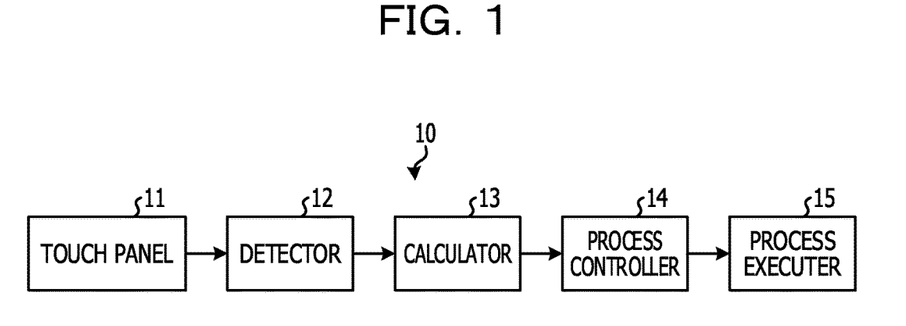
FIG. 1 is a block diagram illustrating an example of a terminal according to a first embodiment.

FIG. 1 is a block diagram illustrating an example of a terminal according to a first embodiment. Referring to FIG. 1, a terminal 10 includes a touch panel 11, a detector 12, a calculator 13, a process controller 14, and a process executer 15. Especially, the first embodiment pays attention to and describes a case where the touch panel 11 is touched by a finger pad and operated.

The touch panel 11 is, for example, a capacitance touch panel. In addition, the touch panel 11 outputs, to the detector 12, information (or coordinates) on positions on the touch panel and information on the amounts of changes in capacitance corresponding to coordinates of the positions. For example, the touch panel 11 includes a number n (n is a natural number of 2 or more) of electrodes (or X electrodes) arranged side by side in X axis direction and a number m (m is a natural number of 2 or more) of electrodes (or Y electrodes) arranged side by side in Y axis direction perpendicular to X axis direction. Specifically, the X electrodes and the Y electrodes are arranged in a matrix form. A region in which a single X electrode and a single Y electrode overlap each other corresponds to a single pair of coordinates. Specifically, the touch panel 11 outputs the amounts of changes in capacitance corresponding to grids (or coordinates) defined by combinations of the X electrodes and Y electrodes.

The detector 12 detects a "touched region" based on the information received from the touch panel 11. For example, the "touched region" is a region defined by continuous coordinates at which the amounts of changes in capacitance are equal to or larger than a first threshold.

The calculator 13 approximates a "first touched region" detected by the detector 12 at a first time and a "second touched region" detected by the detector 12 at a second time to ellipses.

For example, the calculator 13 determines whether or not the number of grids (or touched region grids) included in a touched region located adjacent to each of the touched regions to be subjected to the elliptical approximation is 2 or less. The calculator 13 identifies grids that are included in a touched region located adjacent to each of the touched regions to be subjected to the elliptical approximation and of which the number is determined to be 2 or less. Specifically, the calculator 13 identifies the "edge grids" that are highly likely to exist on the ellipses to be obtained by the approximation. Then, the calculator 13 uses coordinates of the plurality of identified grids to approximate the touched regions to the ellipses. The least squares method is used for the approximation, for example. Since it is assumed that the touch panel 11 is touched by the finger pad and operated, the touched regions may be approximated to the ellipses.

Then, the calculator 13 calculates angles formed between the major axes of the approximated ellipses and a reference axis of the touch panel 11 and calculates reference points of the approximated ellipses. The reference axis of the touch panel 11 is a long axis direction of the touch panel 11 if the touch panel 11 is formed in a rectangular shape, for example. The reference points of the ellipses are the centers of gravity of the ellipses, for example.

The process controller 14 controls a predetermined process based on changes of the second angle and second reference point calculated by the calculator 13 from the second touched region with respect to the first angle and first reference point calculated by the calculator 13 from the first touched region.

For example, the process controller 14 executes control to enlarge or reduce, at a rate corresponding to the difference between the first angle and the second angle, an image displayed on the touch panel 11. In this case, the predetermined process is display control of the touch panel 11.

The process executer 15 executes a process in accordance with the control executed by the process controller 14. If the predetermined process is the display control of the touch panel 11, the control executer 15 executes a process of enlarging or reducing, at the rate corresponding to the difference between the first angle and the second angle, the image displayed on the touch panel 11.

Example of Operations of Terminal

Figure 2:
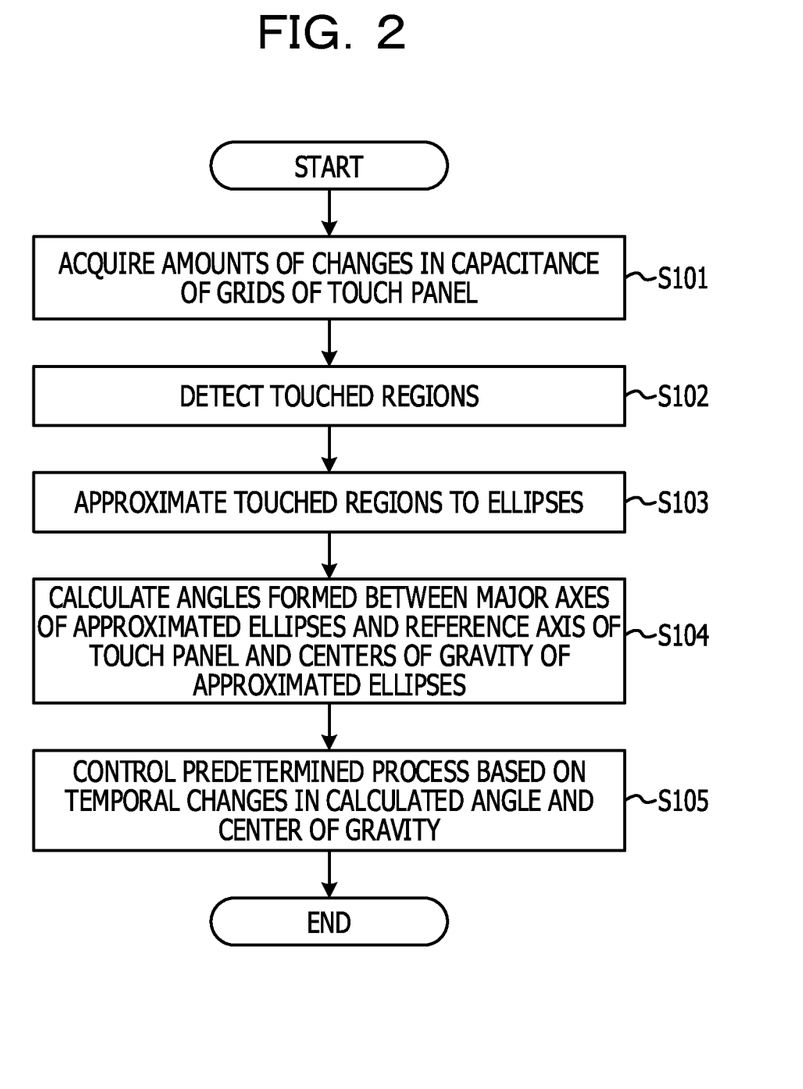
FIG. 2 is a flowchart of an example of process operations of the terminal according to the first embodiment.

An example of process operations of the terminal 10 having the aforementioned configuration is described below. FIG. 2 is a flowchart of the example of the process operations of the terminal according to the first embodiment. Especially, in the flowchart of FIG. 2, the process operations of the detector 12, the calculator 13, and the process controller 14 are illustrated. An overall process operation of the terminal 10 includes processes of the touch panel 11 and process executer 15 before and after the process operations illustrated in the flowchart of FIG. 2.

The detector 12 acquires the amounts of changes in capacitance of the grids of the touch panel 11 (in step S101). For example, the detector 12 acquires the amounts of changes in capacitance at the first time and the amounts of changes in capacitance at the second time.

The detector 12 detects touched regions based on the amounts, acquired in step S101, of the changes in the capacitance (in step S102). The detector 12 uses the amounts of the changes in the capacitance at the first time and the amounts of the changes in the capacitance at the second time to detect the first touched region at the first time and the second touched region at the second time.

The calculator 13 approximates the touched regions detected by the detector 12 to ellipses (in step S103). For example, the calculator 13 approximates the aforementioned first and second touched regions to the ellipses.

Figure 3:
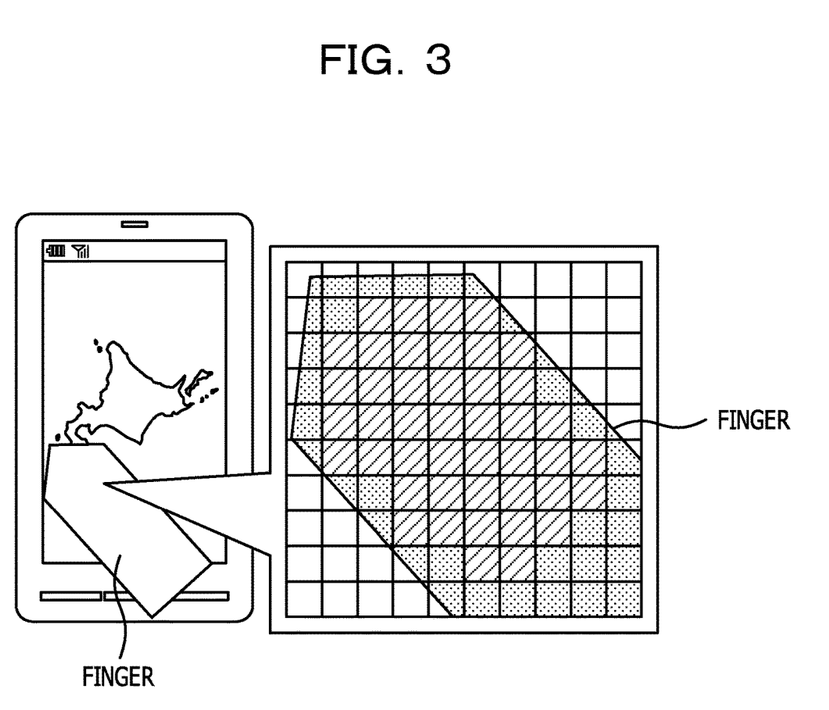
FIG. 3 is a diagram describing an example of an elliptical approximation method.
Figure 4:
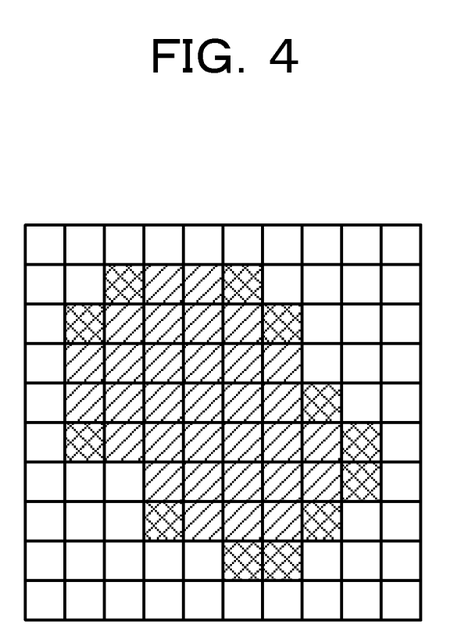
FIG. 4 is a diagram describing an example of the elliptical approximation method.

FIGS. 3 and 4 are diagrams describing an example of the elliptical approximation method.

FIG. 3 illustrates a state in which the touch panel 11 is touched by the finger pad. In FIG. 3, hatched grids are grids in which the amounts of changes in capacitance are equal to or larger than the first threshold. Specifically, in FIG. 3, a group of the hatched grids corresponds to a touched region. Thus, the detector 12 detects the group (or a group of grids hatched by diagonal lines and a group of grids hatched by a mesh-like pattern) of the hatched grids as the touched region.

Then, the calculator 13 determines whether or not the number of grids (or touched region grids) included in a touched region located adjacent to each of the touched regions to be subjected to the elliptical approximation is 2 or less. The calculator 13 identifies grids or edge grids that are included in a touched region located adjacent to each of the touched regions to be subjected to the elliptical approximation and of which the number is determined to be 2 or less. In FIG. 4, grids hatched by a mesh-like pattern are edge grids.

Then, the calculator 13 uses coordinates of the plurality of identified edge grids to approximate the touched regions to the ellipses. The calculator 13 uses the following Equation (1) to calculate the approximated ellipses.

Equation (1)

$$\begin{pmatrix} A \\ B \\ C \\ D \\ E \end{pmatrix} = \begin{pmatrix} \sum X_i^2 Y_i^2 & \sum X_i Y_i^3 & \sum X_i^2 Y_i & \sum X_i Y_i^2 & \sum X_i Y_i \\ \sum X_i Y_i^3 & \sum Y_i^4 & \sum X_i Y_i^2 & \sum Y_i^3 & \sum Y_i^2 \\ \sum X_i^2 Y_i & \sum X_i Y_i^2 & \sum X_i^2 & \sum X_i Y_i & \sum X_i \\ \sum X_i Y_i^2 & \sum Y_i^3 & \sum X_i Y_i & \sum Y_i^2 & \sum Y_i \\ \sum X_i Y_i & \sum Y_i^2 & \sum X_i & \sum Y_i & \sum 1 \end{pmatrix}^{-1} \begin{pmatrix} -\sum X_i^3 Y_i \\ -\sum X_i^2 Y_i^2 \\ -\sum X_i^3 \\ -\sum X_i^2 Y_i \\ -\sum X_i^2 \end{pmatrix} \quad (1)$$

In Equation (1), $(X_i, Y_i)$ represents coordinates of the edge grids. In addition, A, B, C, D, and E are coefficients used when the ellipses are expressed by the following Equation (2).

Equation (2)

$$X_i^2 + AX_iY_i + BY_i^2 + CX_i + DY_i + E = 0 \quad (2)$$

Returning to FIG. 2, the calculator 13 calculates angles formed between the major axes of the approximated ellipses and the reference axis of the touch panel 11 and calculates the centers of gravity of the approximated ellipses (in step S104). For example, the calculator 13 calculates the angles and the centers of gravity from the ellipses obtained by approximating the aforementioned first touched region and the aforementioned second touched region.

Figure 5:
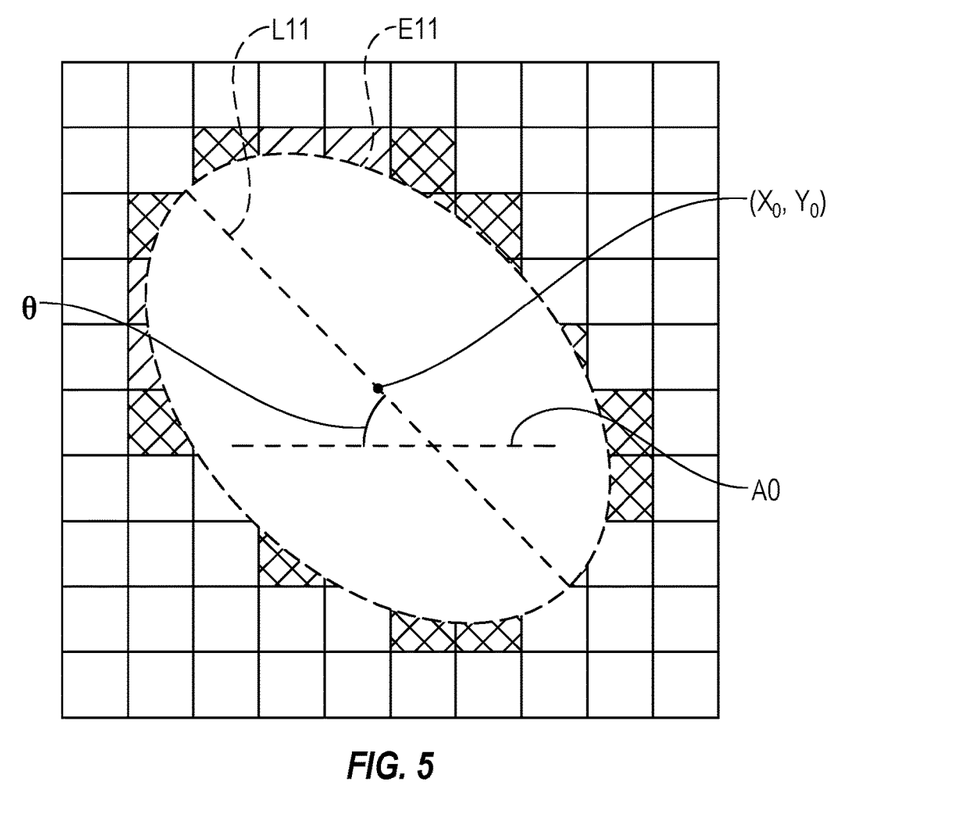
FIG. 5 is a diagram describing calculation of angles and the centers of gravity.

FIG. 5 is a diagram describing the calculation of the angles and the centers of gravity. As illustrated in FIG. 5, the major axis of an approximated ellipse E11 is represented by L11. The reference axis of the touch panel 11 is represented by A0. In this case, the calculator 13 uses the following Equation (3) to calculate an angle θ formed between the major axis L11 and the reference axis A0, for example.

Equation (3)

$$\theta = \frac{\tan^{-1}\left(\frac{A}{1-B}\right)}{2} \quad (3)$$

In addition, the calculator 13 uses the following Equation (4) to calculate coordinates of the center of gravity of the ellipse E11, for example.

Equation (4)

$$X_0 = \frac{AD - 2BC}{4B - A^2} \quad (4)$$
$$Y_0 = \frac{AC - 2D}{4B - A^2}$$

In Equation (4), $X_0$ represents an X coordinate of the center of gravity, and $Y_0$ represents a Y coordinate of the center of gravity.

Returning to FIG. 2, the process controller 14 controls the predetermined process based on a temporal change in the angle calculated by the calculator 13 and a temporal change in the center, calculated by the calculator 13, of gravity (in step S105). Specifically, the calculator 13 controls the predetermined process based on the changes in the second angle and second reference point calculated by the calculator 13 from the second touched region with respect to the first angle and first reference point calculated by the calculator 13 from the first touched region.

For example, the process controller 14 executes the control to enlarge or reduce, at the rate corresponding to the difference between the first angle and the second angle, the image displayed on the touch panel 11. Specifically, in this case, the aforementioned process is the display control of the touch panel 11.

Figure 6:
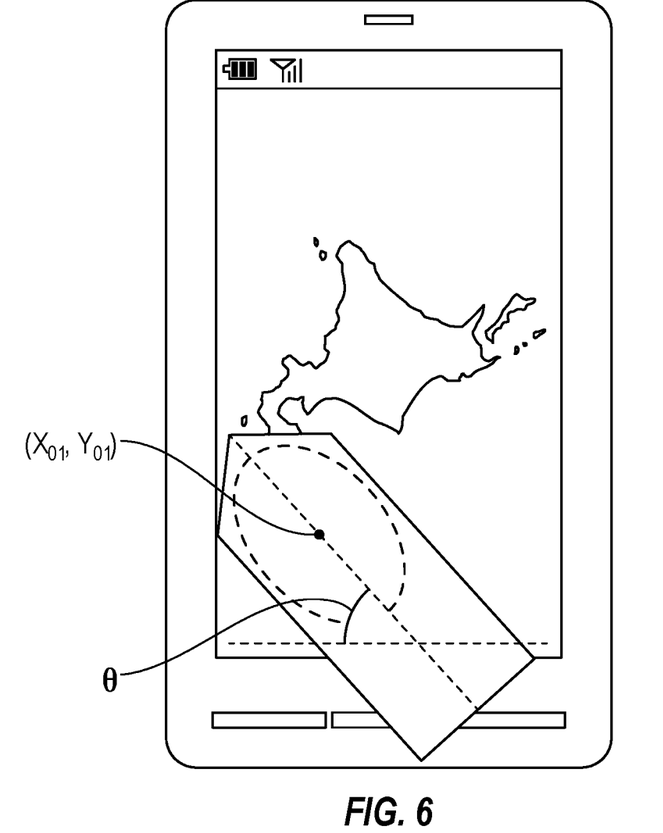
FIG. 6 is a diagram describing process control to be executed if a predetermined process is display control of a touch panel.
Figure 7:
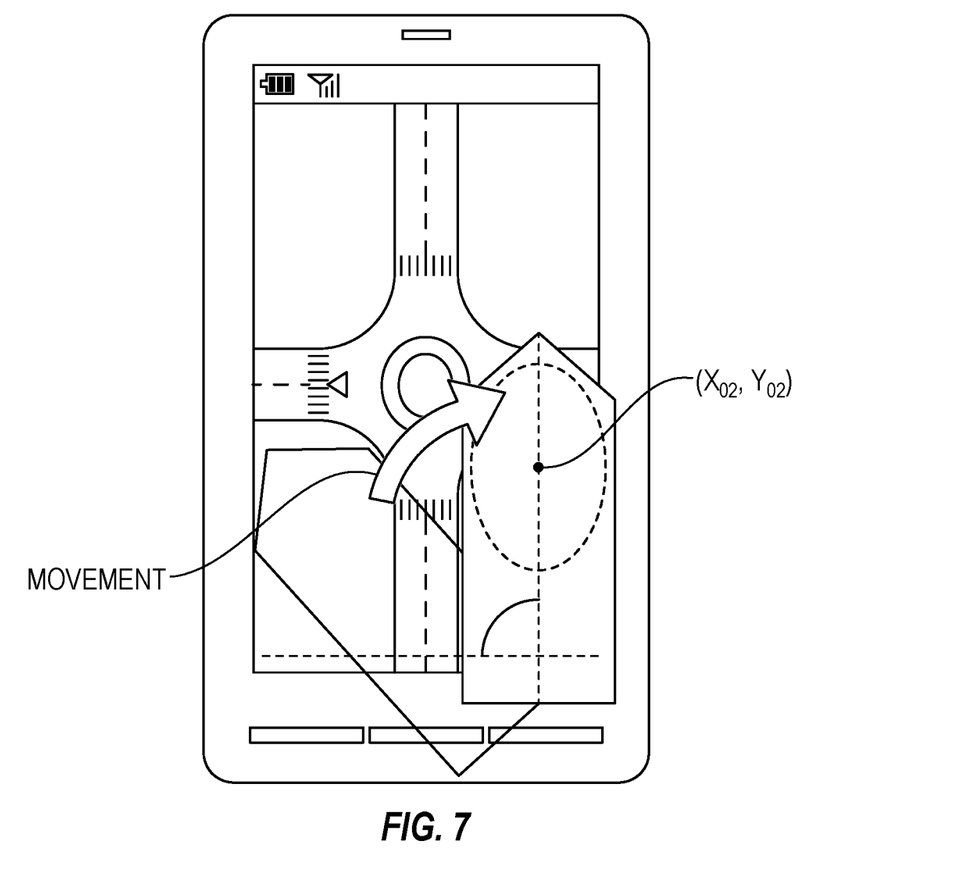
FIG. 7 is a diagram describing the process control to be executed if the predetermined process is the display control of the touch panel.
Figure 8:
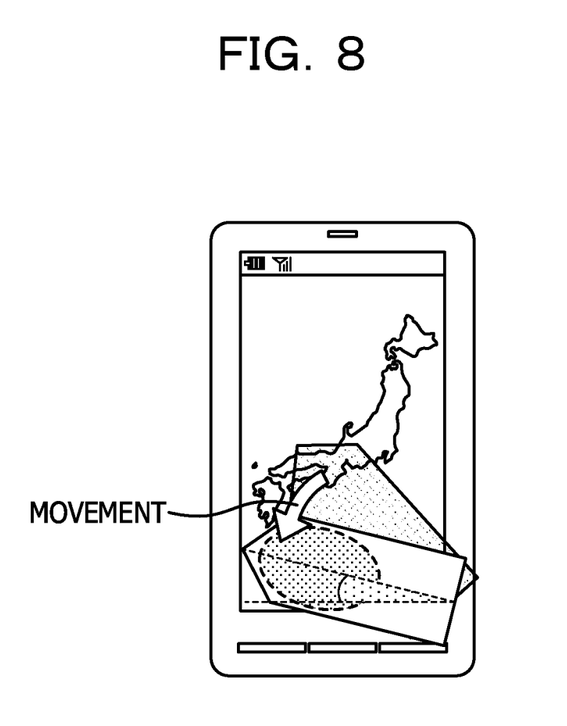
FIG. 8 is a diagram describing the process control to be executed if the predetermined process is the display control of the touch panel.

FIGS. 6, 7, and 8 are diagrams describing the process control if the predetermined process is the display control of the touch panel.

When a finger is moved so as to cause a state, illustrated in FIG. 6, of the touch panel 11 touched by the finger to transition to a state, illustrated in FIG. 7, of the touch panel 11 touched by the finger, or when the finger is moved so as to rotate the major axis of the approximated ellipse of the finger clockwise and move the center of gravity of the approximated ellipse from $(X_{01}, Y_{01})$ to $(X_{02}, Y_{02})$, the displayed image is enlarged. Specifically, when the finger is moved toward a direction where the angle θ increases, the displayed image is enlarged.

On the other hand, when the finger is moved so as to cause the state, illustrated in FIG. 6, of the touch panel 11 touched by the finger to transition to a state, illustrated in FIG. 8, of the touch panel 11 touched by the finger, or when the finger is moved so as to rotate the major axis of the approximated ellipse of the finger counterclockwise and move the center of gravity of the approximated ellipse, the displayed image is reduced. Specifically, when the finger is moved toward a direction where the angle θ is reduced, the displayed image is reduced.

As described above, according to the present embodiment, in the terminal 10, the calculator 13 approximates the first touched region detected by the detector 12 at the first time and the second touched region detected by the detector 12 at the second time to the ellipses. Then, the calculator 13 calculates the angles formed between the major axes of the approximated ellipses and the reference axis of the touch panel 11 and calculates the reference points of the ellipses. Then, the process controller 14 controls the predetermined process based on the changes in the second angle and second reference point calculated by the calculator 13 from the second touched region with respect to the first angle and first reference point calculated by the calculator 13 from the first touched region.

According to the configuration of the terminal 10, the touch panel 11 is touched by a finger pad of a user and operated, and an operation by arc movement of the finger pad may be treated as a single process execution instruction operation. Since this movement is accomplished by one hand, it is possible to increase the number of types of process execution instruction operations that are easily performed with one hand and to improve the usability.

For example, the process controller 14 executes the control to enlarge or reduce, at the rate corresponding to the difference between the first angle and the second angle, the image displayed on the touch panel.

According to the configuration of the terminal 10, operations of enlarging and reducing a displayed image, which are achieved by the "pinch-in operation" and the "pinch-out operation" that are difficult to be executed by one hand, may be achieved by the process execution instruction operations that are easily performed with one hand.

Second Embodiment

A second embodiment takes into account both operation by touching the touch panel with a finger pad and operation by touching the touch panel with a fingertip.

Example of Configuration of Terminal

Figure 9:
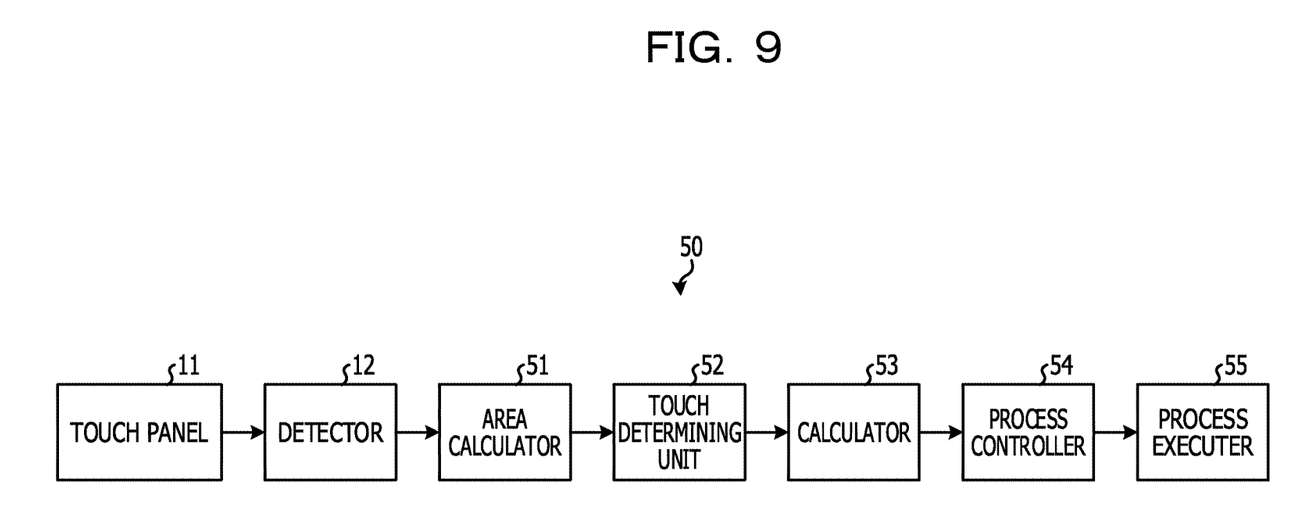
FIG. 9 is a block diagram illustrating an example of a terminal according to a second embodiment.

FIG. 9 is a block diagram illustrating an example of a terminal according to the second embodiment. Referring to FIG. 9, a terminal 50 includes an area calculator 51, a touch determining unit 52, a calculator 53, a process controller 54, and a process executer 55.

The area calculator 51 calculates (counts) the area of a touched region detected by the detector 12 or the number of grids included in the touched region, for example. The area of the detected touched region may be 0. In this case, the area calculator 51 may determine that the touch panel 11 is not touched.

The touch determining unit 52 determines, based on the area, calculated by the area calculator 51, of the touched region, whether a touch state of the touch panel 11 is a state in which "a large region is touched", a state in which "a small region is touched", or an "untouched state". For example, if the area, calculated by the area calculator 51, of the touched region is larger than a first determination threshold, the touch determining unit 52 determines that the touch panel 11 is in the state in which "the large region is touched". If the area, calculated by the area calculator 51, of the touched region is equal to or smaller than the first determination threshold and larger than a second determination threshold, the touch determining unit 52 determines that the touch panel 11 is in the state in which "the small region is touched". In addition, if the area, calculated by the area calculator 51, of the touched region is equal to or smaller than the second determination threshold, the touch determining unit 52 determines that the touch panel 11 is in the "untouched state".

The calculator 53 calculates a parameter corresponding to a touched state determined by the touch determining unit 52. For example, if the touch determining unit 52 determines that the touch panel 11 is in the state in which "the large region is touched", the calculator 53 approximates the touched region to an ellipse in the same manner as the first embodiment and calculates, as a parameter for the touched large region, an angle formed between the major axis of the approximated ellipse and the reference axis of the touch panel 11 and a reference point of the approximated ellipse. The calculated parameter is output to the process controller 54.

In addition, if the touch determining unit 52 determines that the touch panel 11 is in the state in which "the small region is touched", the calculator 53 calculates, as a parameter for the touched small region, coordinates of the position of the touched region (for example, coordinates of the center of gravity of the touched region). The calculated parameter is output to the process controller 54. If the touch determining unit 52 determines that the touch panel 11 is in the "untouched state", the calculator 53 does not calculate a parameter.

The process controller 54 executes control based on a parameter received from the calculator 53. For example, when receiving the parameter for the touched large region, the process controller 54 controls the predetermined process based on the changes in the second angle and second reference point calculated by the calculator 13 from the second touched region with respect to the first angle and first reference point calculated by the calculator 13 from the first touched region in the same manner as the first embodiment.

In addition, when receiving the parameter for the touched small region, the process controller 54 execute control for the touched small region. For example, the process controller 54 uses the coordinates of the position of the touched region to control a dragging process or control a process of selecting an icon.

The process executer 54 executes a process in accordance with the control executed by the process controller 54.

Example of Operations of Terminal

Figure 10:
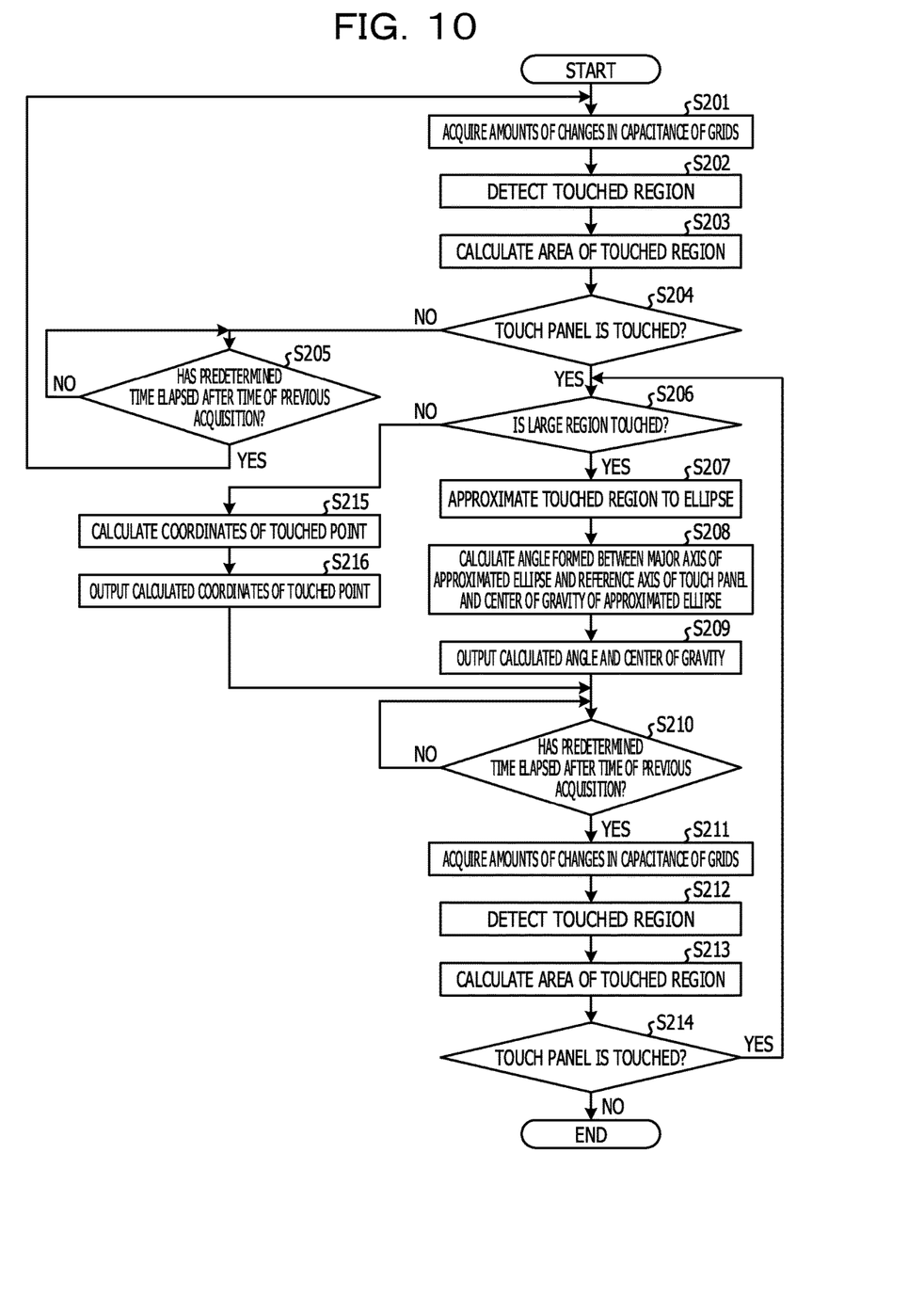
FIG. 10 is a flowchart of an example of process operations of the terminal according to the second embodiment.
Figure 11:
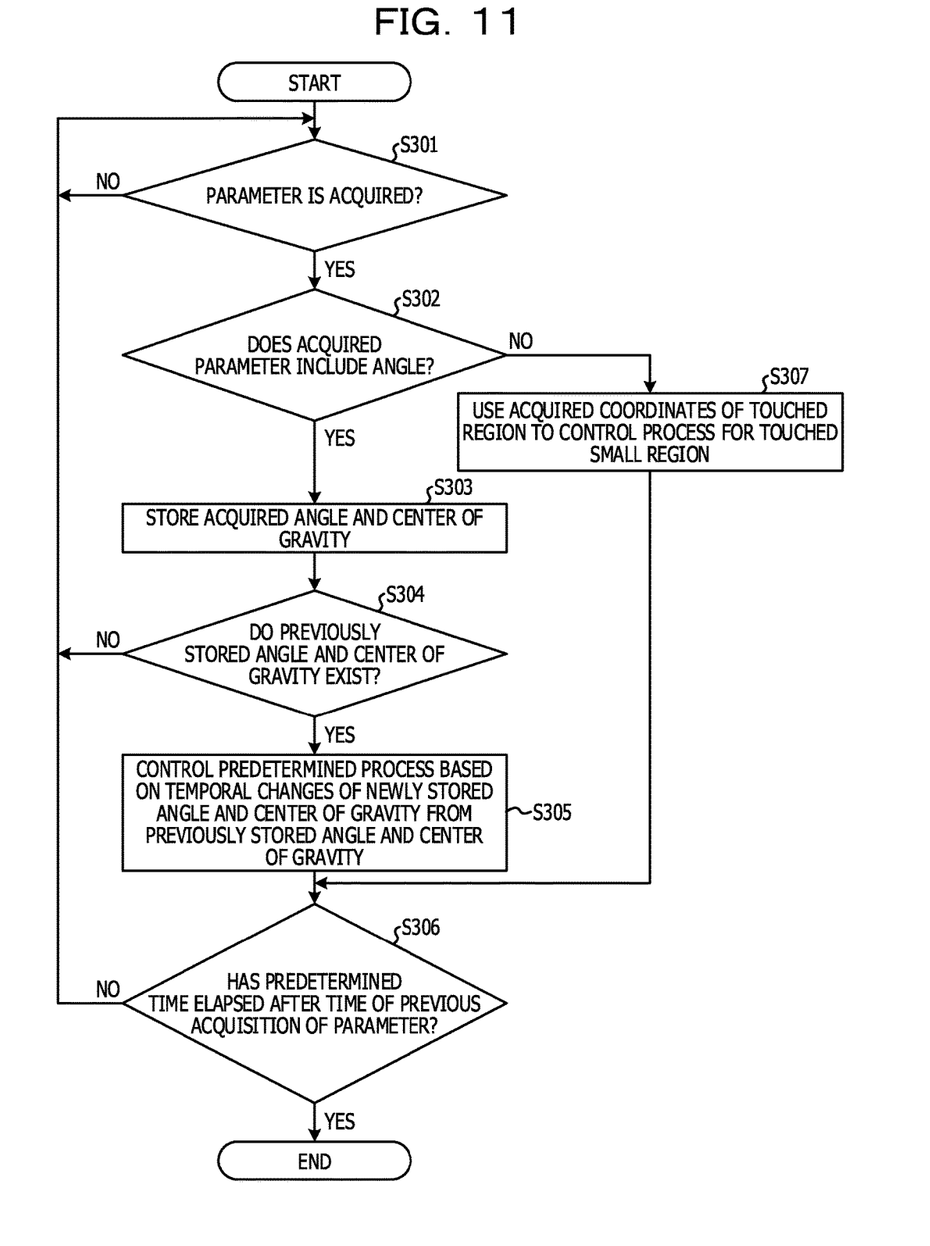
FIG. 11 is a flowchart of an example of process operations of the terminal according to the second embodiment.

Examples of process operations of the terminal 50 having the aforementioned configuration are described. FIGS. 10 and 11 are flowcharts of the examples of the process operations of the terminal according to the second embodiment. In the flowchart of FIG. 10, process operations of the detector 12, the area calculator 51, the touch determining unit 52, and the calculator 53 are illustrated. In addition, in the flowchart of FIG. 11, process operations of the process controller 54 are illustrated.

Regarding FIG. 10, the detector 12 acquires the amounts of changes in the capacitance of the grids on the touch panel 11 (in step S201).

The detector 12 detects a touched region based on the amounts, acquired in step S201, of the changes in the capacitance (in step S202).

The area calculator 51 calculates the area of the touched region detected by the detector 12 (in step S203).

The touch determining unit 52 determines, based on the area calculated by the area calculator 51, whether or not the touch panel 11 is touched (in step S204).

If the touch determining unit 52 determines that the touch panel 11 is not touched (No in step S204), the detector 12 waits until a predetermined time elapses after the time of the previous acquisition (No in step S205). If the predetermined time has elapsed after the time of the previous acquisition (Yes in step S205), the detector 12 executes the process of step S201.

If the touch determining unit 52 determines that the touch panel 11 is touched (Yes in step S204), the touch determining unit 52 determines whether or not the touch panel 11 is in the state in which a large region is touched or whether the touch panel 11 is in the state in which the large region is touched or in the state in which a small region is touched (in step S206).

If the touch determining unit 52 determines that the touch panel 11 is in the state in which the large region is touched (Yes in step S206), the calculator 53 approximates the touched region to an ellipse (in step S207) and calculates an angle formed between the major axis of the approximated ellipse and the reference axis of the touch panel 11 and the center of gravity of the approximated ellipse (in step S208).

The calculator 53 outputs information of the calculated angle and the calculated center of gravity to the process controller 54 (in step S209).

The detector 12 waits until the predetermined time elapses after the time of the previous acquisition (No in step S210). If the predetermined time has elapsed after the time of the previous acquisition (Yes in step S210), the detector 12 acquires the amounts of changes in the capacitance of the grids of the touch panel 11 (in step S211).

The detector 12 detects a touched region based on the amounts of the changes in the capacitance of the grids of the touch panel 11 (in step S212).

The area calculator 51 calculates the area of the touched region detected by the detector 12 (in step S213).

The touch determining unit 52 determines, based on the area calculated by the area calculator 51, whether or not the touch panel 11 is touched (in step S214).

If the touch determining unit 52 determines that the touch panel 11 is not touched (No in step S214) or that the touched state is released, the process flow illustrated in FIG. 10 is terminated.

If the touch determining unit 52 determines that the touch panel 11 is touched (Yes in step S214), the process flow returns to step S206.

If the touch determining unit 52 determines that the touch panel 11 is in the state in which a small region is touched (No in step S206), the calculator 51 calculates coordinates of the touched region or point (in step S215) and outputs information of the calculated coordinates to the process controller 54 (in step S216).

Next, regarding FIG. 11, the process controller 54 waits for a parameter output from the calculator 53 (No in step S301). When receiving the parameter (Yes in step S301), the process controller 54 determines whether or not the acquired parameter includes information of an angle (in step S302). Specifically, the process controller 54 determines whether or not the acquired parameter is a parameter for a touched large region or a parameter for a touched small region.

If the acquired parameter includes the information of the angle (Yes in step S302) or the acquired parameter is the parameter for the touched large region, the process controller 54 stores the acquired information of the angle and the center of gravity in a memory (not illustrated) (in step S303).

The process controller 54 determines whether or not previously acquired information of an angle and the center of gravity or a previously acquired parameter for a touched large region has been stored in the aforementioned memory (in step S304).

If the process controller 54 determines that the previously acquired parameter for the touched large region has been stored (Yes in step S304), the process controller 54 controls the predetermined process based on temporal changes of the newly stored angle and center of gravity from the previously stored angle and center of gravity (in step S305). Specifically, the previously stored angle and the previously stored center of gravity correspond to the second angle and the second center of gravity in the first embodiment. In addition, the newly stored angle and the newly stored center of gravity correspond to the first angle and the first center of gravity in the first embodiment.

The process controller 54 determines whether or not a predetermined time has elapsed after the time of the previous acquisition of the parameter (in step S306).

If the process controller 54 determines that the predetermined time has elapsed after the time of the previous acquisition of the parameter (Yes in step S306) or the touched state is released, the process flow illustrated in FIG. 11 is terminated.

If the process controller 54 determines that the predetermined time has yet to elapse after the time of the previous acquisition of the parameter (No in step S306), the process flow returns to step S301. If the process controller 54 determines that the previously acquired parameter for the touched large region is not stored (No in step S304), the process flow returns to step S301.

If the acquired parameter does not include the information of the angle (No in step S302) or the acquired parameter is the parameter for the touched small region, the process controller 54 uses the acquired coordinates of the touched point to control a process for the touched small region (in step S307). Then, the process flow proceeds to step S306.

As described above, according to the present embodiment, in the terminal 50, the touch panel 11 is operated by a process execution instruction operation upon the touch of a small region and is touched by a finger pad of a user and operated, and an operation by arc movement of the finger pad may be treated as a single process execution instruction operation. Since this movement is accomplished by one hand, it is possible to increase the number of types of process execution instruction operations that are easily performed with one hand and to improve the usability.

Another Embodiment

[1] Although the first embodiment does not describe a requirement for the predetermined control that is executed by the process controller 14 based on the temporal changes in the angle and center of gravity calculated by the calculator 13, the following requirement may be added, for example. That is, the requirement may be that a "rotational axis" upon the movement of the first ellipse obtained by approximating the first touched region to the second ellipse obtained by approximating the second touched region, or an intersection of a line extended through the major axis of the first ellipse with a line extended through the major axis of the second ellipse, is located outside the first and second ellipses.

[2] The constituent elements of the terminals illustrated in the first and second embodiments may not be physically configured in the manners illustrated in the drawings. Specifically, the detailed separations and integrations of the terminals are not limited to the drawings. All or a part of the constituent elements may be functionally or physically separated and integrated on an arbitrary basis based on loads and usage states of the constituent elements.

In addition, all or a part of the various process functions to be executed by the terminals may be executed on a central processing unit (CPU) (or a microcomputer such as an micro processing unit (MPU) or an micro controller unit (MCU)). Furthermore, all or a part of the process functions may be executed on a program analyzed and executed by the CPU (or the microcomputer such as the MPU or the MCU) or on hardware by wired logic.

The terminals according to the first and second embodiments may be achieved by the following hardware configuration.

Figure 12:
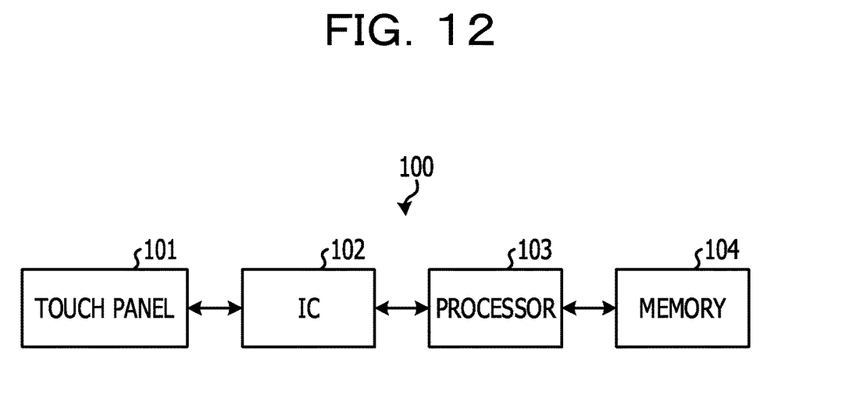
FIG. 12 is a diagram illustrating an example of hardware configurations of the terminals.

FIG. 12 is a diagram illustrating an example of hardware configurations of the terminals. As illustrated in FIG. 12, a terminal 100 includes a touch panel 101, an integrated circuit (IC) 102, a processor 103, and a memory 104. Examples of the processor 103 are a CPU, a DSP, and an field programmable gate array (FPGA). In addition, examples of the memory 104 are a random access memory (RAM) such as an synchronous dynamic random access memory (SDRAM), a read only memory (ROM), and a flash memory.

For example, the detector 12, calculators 13, 53, area calculator 51, and touch determining unit 52 of the terminals according to the first and second embodiments may be achieved by the IC 102. In this case, programs that correspond to the processes to be executed by the process controllers 14, 54 and the process executers 15, 55 are stored in the memory 104 and executed by the processor 103. Alternatively, the detector 12, the calculators 13, 53, the area calculator 51, the touch determining unit 52, and the process controllers 14, 54 may be achieved by the IC 102. In this case, programs that correspond to the processes to be executed by the process executers 15, 55 may be stored in the memory 104 and executed by the processor 103. The touch panel 11 may be achieved by the touch panel 101.

Alternatively, programs that correspond to the processes to be executed by the detector 12, the calculators 13, 53, the process controllers 14, 54, the process executers 15, 55, the area calculator 51, and the touch determining unit 52 may be stored in the memory 104 and executed by the processor 103.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. An electronic device comprising:
a detector configured to detect a region touched on a touch panel;
a memory; and
a processor coupled to the memory, configured to:
approximate, to a first ellipse, a first touched region detected by the detector at a first time, the first ellipse is approximated based on first coordinates of first grids included in the first touched region;
approximate, to a second ellipse, a second touched region detected by the detector at a second time, the second ellipse is approximated based on second coordinates of second grids included in the second touched region,
calculate a first angle formed between a first major axis of the first ellipse and a reference axis of the touch panel;
calculate a first reference point of the first ellipse based on a first center of gravity of the first ellipse;
calculate a second angle formed between a second major axis of the second ellipse and the reference axis of the touch panel;
calculate a second reference point of the second ellipse based on a second center of gravity of the second ellipse;
determine an angle difference between the first angle and the second angle;
determine a location difference between the first reference point and the second reference point;
calculate an area of the second touched region;
determine a touch state of the touch panel based on the area; and
control to enlarge or reduce an image displayed on the touch panel based on the determined touch state, the angle difference, and the location difference, wherein a rate of the enlarging or reducing corresponds to the angle difference and the location difference.

2. A control method comprising:
detecting a region touched on a touch panel;
approximating, to a first ellipse, a first touched region detected at a first time, the first ellipse is approximated based on first coordinates of first grids included in the first touched region;
approximating, to a second ellipse, a second touched region detected at a second time, the second ellipse is approximated based on second coordinates od second grids included in the second touched region;
calculating a first angle formed between a first major axis of the first ellipse and a reference axis of the touch panel;
calculating a first reference point of the first ellipse based on a first center of gravity of the first ellipse;
calculating a second angle formed between a second major axis of the second ellipse and the reference axis of the touch panel;
calculating a second reference point of the second ellipse based on a second center of gravity of the second ellipse;
determining an angle difference between the first angle and the second angle;
determining a location difference between the first reference point and the second reference point;
calculating an area of the second touched region;
determining a touch state of the touch panel based on the area; and
controlling to enlarge or reduce an image displayed on the touch panel based on the determined touch state, the angle difference, and the location difference, wherein a rate of the enlarging or reducing corresponds to the angle difference and the location difference.

3. An integrated circuit comprising:
a detector configured to detect a region touched on a touch panel;
a calculator configured to:
approximate, to a first ellipse, a first touched region detected by the detector at a first time, the first ellipse is approximated based on first coordinates of first grids included in the first touched region;
approximate, to a second ellipse, a second touched region detected by the detector at a second time, the second ellipse is approximated based on second coordinates of second grids included in the second touched region;
calculate a first angle formed between a first major axis of the first ellipse and a reference axis of the touch panel;
calculate a first reference point of the first ellipse based on a first center of gravity of the first ellipse;
calculate a second angle formed between a second major axis of the second ellipse and the reference axis of the touch panel;
calculate a second reference point of the second ellipse based on a second center of gravity of the second ellipse;
calculate an angle difference between the first angle and the second angle;
calculate an area of the second touched region; and
output the calculated results; and
a processor controller configured to:
determine a touch state of the touch panel based on the area; and
control to enlarge or reduce an image displayed on the touch panel based on the determined touch state, the angle difference, and the location difference, wherein a rate of the enlarging or reducing corresponds to the angle difference and the location difference.

4. The electronic device according to claim 1, wherein the processor is configured to determine at least one of a first state in which a large region is touched, a second state in which a small region is touched, and an untouched state as the touch state of the touch panel.

5. The electronic device according to claim 4, wherein the processor is configured to determine the first state when the area is larger than a first determination threshold, the second state when the area is equal to or smaller than the first determination threshold and larger than a second determination threshold, and the untouched state when the area is equal to or smaller than the second determination threshold.

6. The electronic device according to claim 4, wherein the processor is configured to determine to control to enlarge or reduce the image in response to determining that the touch state is the first touch state.

* * * * *